United States Patent [19]

Kitagawa et al.

[11] Patent Number: 4,923,910

[45] Date of Patent: May 8, 1990

[54] EPOXY RESIN POWDER COATING COMPOSITION WITH EXCELLENT ADHESIBILITY

[75] Inventors: Katugi Kitagawa, Saitama; Akira Shinozuka, Matsudo, both of Japan

[73] Assignee: Somar Corporation, Tokyo, Japan

[21] Appl. No.: 396,732

[22] Filed: Aug. 18, 1989

Related U.S. Application Data

[63] Continuation-in-part of Ser. No. 234,056, Aug. 19, 1988, abandoned.

[51] Int. Cl.$^5$ .................... C08L 63/02; C08K 7/14; C08K 3/36; C08K 3/34
[52] U.S. Cl. .................... 523/428; 523/429; 523/457; 523/466
[58] Field of Search .............. 523/428, 429, 457, 466

[56] References Cited

U.S. PATENT DOCUMENTS

| | | | |
|---|---|---|---|
| 4,066,625 | 1/1978 | Bolger | 523/400 |
| 4,555,532 | 11/1985 | Tanaka et al. | 523/440 |
| 4,639,476 | 1/1987 | Tajiri et al. | 523/466 |

*Primary Examiner*—Lewis T. Jacobs
*Attorney, Agent, or Firm*—Sughrue, Mion, Zinn, Macpeak & Seas

[57] ABSTRACT

An epoxy resin powder coating composition with excellent adhesibility which comprises a bisphenol A type mixed epoxy resin having a number average molecular weight of from 800 to 2,000 comprising a mixture of a bisphenol A type epoxy resin having an average molecular weight of from 350 to 1,000 and a bisphenol A type epoxy resin having a number average molecular weight of from 2,500 to 8,000, an imidazole base compound, dicyandiamide, a pre-reacted product of an imidazole base compound with epoxy resin, and a filler.

6 Claims, No Drawings

EPOXY RESIN POWDER COATING COMPOSITION WITH EXCELLENT ADHESIBILITY

This is a continuation-in-part of application Ser. No. 07/234,056, filed Aug. 19, 1988, now abandoned.

FIELD OF THE INVENTION

The present invention relates to an epoxy resin powder coating composition which has strong adhesion to solid surfaces.

BACKGROUND OF THE INVENTION

Epoxy resin powder coating compositions comprising an epoxy resin, a hardener, and a fillers are widely used for the insulation of electric and electronic parts. Also known are their applications for fixing rotor coils of motors and generators. That is, the entire coil is fixed to the rotor core with the resin to avoid the coil dropping out from the rotor core due to the intense centrifugal force generated from its rotation.

However, the conventional epoxy resin powder coating compositions to be used for the above purpose have poor adhesibility that had difficulty to firmly fix the coil to the rotor core.

SUMMARY OF THE INVENTION

The object of the present invention is to resolve the aforesaid problems of the conventional epoxy resins. That is, the present invention provides an epoxy resin powder coating composition with excellent adhesibility which comprises a bisphenol A type mixed epoxy resin having a number average molecular weight of from 800 to 2,000 comprising a mixture of a bisphenol A type epoxy resin having a number average molecular weight of from 350 to 1,000 and a bisphenol A type epoxy resin having a number average molecular weight of from 2,500 to 8,000, an imidazole base compound, dicyandiamide, a pre-reacted product of an imidazole base compound with epoxy resin, and a filler.

The epoxy resin used in the present invention is a mixed epoxy resin having a number average molecular weight of from 800 to 2,000, preferably from 1,000 to 1,800, comprising a bisphenol A type epoxy resin having a number average molecular weight of from 350 to 1,000 and a bisphenol A type epoxy resin having a number average molecular weight of from 2,500 to 8,000. When the number average molecular weight of the mixed epoxy resin is less than 800, the coating composition is subject to blocking during storage or to sagging at the hardening of the coating. When the number average molecular weight exceeds 2,000, on the other hand, the coating composition would not be sufficiently incorporated between the rotor core and the coils. Therefore, the fixing of the coil to rotor core becomes insufficient.

The mixed epoxy resin may additionally incorporate other types of epoxy resins. Preferable examples of those epoxy resins which improve adhesion, toughness, and flowability of the coating include bisphenol F type, dimeric acid ester with glycidyl, polyalkylene glycol diglycidyl ether type, bisphenol S type, hexahydrophthalic acid ester with diglycidyl type, hydrogenated bisphenol A diglycidyl ether type, and the like. The amount to be added is from 2 to 20%, preferably from 5 to 10% by weight of the total amount of mixed epoxy resin. Further, a polyfunctional epoxy resin having at least three epoxy groups per molecule may also be incorporated into the mixed resin in order to improve thermal resistance of the coating. Examples of such epoxy resins are novolak type epoxy resin (e.g., o-cresol novolak type, phenol novolak type, etc.), triglycidyl ether type resin (e.g., epoxy compounds of cyanuric acid or triphenylpropane), tetraglycidyl ether type resin (e.g., epoxy compounds of bisresorcinol F, tetraoxytetraphenylethane, etc.), and the like. The amount to be added is from 2 to 30%, preferably from 5 to 15% by weight of the total amount of mixed epoxy resin.

Hardeners to beblended include an imidazole base compound (denoted "hardener A" hereinafter), dicyandiamide (denoted "hardener B" hereinafter), and a pre-reacted product of an imidazole compound with epoxy resin (denoted "hardener C" hereinafter). The imidazole compound, dicyandiamide, and the pre-reacted product each works as the hardener for the epoxy resin. Additionally, dicyandiamide and the pre-reacted product promote hardening and improve the adhesion of the powder coating composition. The hardener A to be used is shown by the general formula (I) as follows:

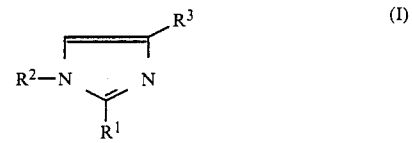

wherein $R^1$ is an alkyl or an aryl; preferable are methyl, ethyl and phenyl, and most preferable among them is methyl. $R^2$ is a hydrogen atom, a cyanoalkyl, or an aryl; preferable are a hydrogen atom, cyanoethyl, and benzyl, most preferable among them is a hydrogen atom. $R^3$ is a hydrogen atom or an alkyl and preferable are a hydrogen atom and methyl. Preferably, the alkyl groups have 1 to 20 carbon atoms and the aryl groups have 6 to 20 carbon atoms.

For the pre-reacted product of an imidazole compound with an epoxy resin, the imidazole compounds (I) with $R^2$ being hydrogen are suitably used as an imidazole compound, and an epoxy resin such as the aforecited bisphenol A type epoxy resin, bisphenol F type epoxy resin, and dimeric acid ester with glycidyl type epoxy resin, are employed. The pre-reacted product is favorably prepared to have X/Y higher than 0.5 and lower than 1.2, where X is the epoxy equivalent of the epoxy resin and Y is the NH group equivalent of the imidazole base compound. An example is one obtained by heating 36 to 54 parts, preferably 40 to 50 parts, by weight of an imidazole compound, e.g., 2-methylimidazole, with 100 parts by weight of an epoxy resin having an epoxy equivalent of 190 at 50° to 100° C. to effect the reaction.

The aforesaid hardener A is generally incorporated in an amount of 0.1 to 3 parts, preferably 0.3 to 2 parts, by weight per 100 parts, by weight of mixed epoxy resin. Dicyandiamide (hardener B) is normally incorporated in an amount of 1 to 10 parts, preferably 1.5 to 7 parts, by weight per 100 parts by weight of mixed epoxy resin. The foresaid pre-reacted product (hardener C) is normally incorporated in an amount of 0.2 to 3 parts, preferably 0.4 to 2 parts, by weight per 100 parts by weight of mixed epoxy resin.

The powder coating composition of the present invention contains fillers. Conventionally used fillers such as silica, calcium carbonate, dolomite $(Ca \cdot Mg(CO_3)_2)$, calcium silicate, alumina, clay, mica, talc, and powdered glass fibers may be used, however, coatings having excellent cuttability are obtained with fillers having a Mohs' hardness of 4 or less. Examples suitably used are calcium carbonate, dolomite, clay, and the like. Granular fillers give coatings with better cuttability as compared with acicular or flaky fillers. The average particle size of the fillers is in the range from 0.5 to 75 μm, preferably from 3 to 50 μm. Finer grained fillers are more effective to obtain powder coating compositions with better cuttability.

In the powder coating composition of the present invention, the use of amorphous fillers with a Mohs' hardness of 4 or lower improves coating cuttability and thus increases cutting efficiency of the powder coating composition applied rotor coil at cutfinishing processing after being fixed. That is, the rotor surface at which the coil is exposed is wholly coated with a powder coating composition, and then thinly cut with a cutting blade so that the coating film should remain. In such a treatment, a coating with poor cuttability may generate cracks on the coating, and may also increase the wear loss of the cutting blade. The use of a powder coating composition of the present invention, particularly those improved in coating cuttability, provides a solution to the above problems.

The present powder coating composition may appropriately contain auxiliary components conventionally used in powder coating compositions of this type, such as leveling agents of acrylic acid ester oligomers, pigments, and a variety of hardening promoters.

Any standard method may be employed for blending the ingredient comprising the present epoxy resin powder coating composition. For example, the ingredients are mixed using a mixer or the like, then kneaded using a kneader or the like, further melt-mixed with an extruder or the like, cooled to solidify, and ground to fine particles.

The present invention is hereinafter described in greater detail with reference to examples, which are not to be construed as limiting the scope thereof. Unless otherwise indicated, all parts, percents and ratios are by weight.

EXAMPLES

Epoxy resin powder coating compositions having the components (in parts by weight) as shown in Table 1 were prepared and subjected to performance tests. The results are shown in Table 1.

The following are the explanations for the components in Table 1.

Epikote 1007: A bisphenol A type epoxy resin having a number average molecular weight of 2,900, from Yuka Shell Epoxy Co., Ltd.

Epikote 1001: A bisphenol A type epoxy resin having a number average molecular weight of 900, from Yuka Shell Epoxy Co., Ltd.

Hardener A: 2-Methylimidazole

Hardener B: Dicyandiamide

Hardener C: A pre-reacted product of 2-methylimidazole and Epikote 828 (a bisphenol A type epoxy resin having an epoxy equivalent of 190, from Yuka Shell Epoxy Co., Ltd.), with the content ratio by weight of 45 to 100.

The performance of the powder coating composition was evaluated using the methods and the standards as follows.

(1) Adhesibility

A 50 mm×20 mm×1 mm soft steel plate was coated with the powder coating composition at 150° C. which was then thermoset. The coated plate was cooled down to room temperature and bent to observe the peeling off of the coating at the bend. The adhesibilities were classified according to the description as follows, and those described with ◎ or ○ were considered to have fair adhesibility.

◎ : Small amount of peeling of the coating being observed at the bend, but with essentially no dropping off.

○ : Partial peeling and dropping off of the coating is observed at the bend.

Δ: Peeling and dropping off of the coating is observed in a large area of the bend.

×: Peeling and dropping off of nearly whole of the coating is observed.

(2) Hardenability

The gel time of the powder coating composition was measured at the hot plate temperature of 150° C. according to the JIS C-2104 standardized method. The values were classified into four and marked as follows. Those marked with ◎ or ○ are judged to have fair hardenability.

◎ : The gel time is 40 seconds or more and less than 60 seconds.

○ : The gel time is 30 seconds or more and less than 40 seconds, or 60 seconds or more and less than 65 seconds.

Δ: The gel time is 21 seconds or more and less than 30 seconds, or 65 seconds or more and 70 seconds or less.

×: The gel time is less than 21 seconds or exceeding 70 seconds.

(3) Powder Storage Stability

The powder coating composition was stored under a constant temperature of 40° C. and a constant relative humidity of 80% for 7 days. The gel time was measured at the hot plate temperature of 150° C. according to the JIS C-2104 standardized method, and the values obtained were reduced taking the gel time of the as-prepared product (measured under the same condition as above) to be 100. The reduced values were classified into four groups as follows. Those marked with ◎ or ○ are considered to having fair storage stability.

◎ : The gel time is 80 or more.

○ : The gel time is 60 or more and less than 80.

Δ: The gel time is 40 or more and less than 60.

×: The gel time is less than 40.

TABLE 1

|  | 1 | 2* | 3* | 4* | 5 | 6 |
|---|---|---|---|---|---|---|
| Epikote 1007 | 30 | 30 | 30 | 70 | 20 | 20 |
| Epikote 1001 | 70 | 70 | 70 | 30 | 80 | 80 |
| Hardener A | 0.7 | 1 | — | 0.7 | 1.5 | 0.95 |
| Hardener B | 2.4 | — | 2.4 | 2.4 | 3.2 | 3.2 |
| Hardener C | 0.6 | — | 0.6 | 0.6 | 0.8 | 0.8 |
| Calcium carbonate | 60 | 60 | 60 | 60 | 60 | 60 |
| Average molecular weight | 1,515 | 1,515 | 1,515 | 2,300 | 1,310 | 1,310 |
| Adhesibility | ◎ | Δ | ○ | Δ | ◎ | ◎ |
| Hardenability | ◎ | ○ | Δ~× | ○ | ◎ | ◎ |
| Storage stability | ◎ | × | ◎ | ◎ | ◎~○ | ◎ |

*A comparative sample

While the invention has been described in detail and with reference to specific embodiments thereof, it will be apparent to one skilled in the art that various changes and modifications can be made therein without departing from the spirit and scope thereof.

What is claimed is:

1. An epoxy resin powder coating composition with excellent adhesibility which comprises a bisphenol A mixed epoxy resin having a number average molecular weight of from 800 to 2,000 comprising a mixture of a bisphenol A epoxy resin having a number average molecular weight of from 350 to 1,000 and a bisphenol A epoxy resin having a number average molecular weight of from 2,500 to 8,000, an imidazole compound, dicyandiamide, a pre-reacted product of an imidazole compound with epoxy resin, and a filler, wherein the amount of said imidazole compound is 0.1 to 3 parts by weight per 100 parts by weight of the mixed epoxy resin, the amount of said dicyandiamide is 1 to 10 parts by weight per 100 parts by weight of the mixed epoxy resin and the amount of said pre-reacted product is 0.2 to 3 parts by weight per 100 parts by weight of the mixed epoxy resin.

2. An epoxy resin powder coating composition as claimed in claim 1, wherein said bisphenol A mixed resin has an average molecular weight from 1,000 to 8,000.

3. An epoxy resin powder coating composition as claimed in claim 1, wherein said imidazole compound is represented by formula (I):

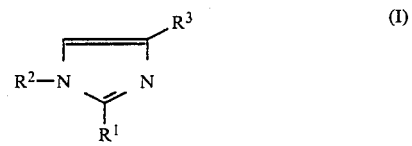

wherein $R^1$ represents an alkyl group or an aryl group, $R^2$ represents a hydrogen atom, a cyanoalkyl group, or an aryl group, and $R^3$ represents a hydrogen atom or an alkyl group.

4. An epoxy resin powder coating composition as claimed in claim 1, wherein in said pre-reacted product of an imidazole compound with epoxy resin, the imidazole compound is represented by formula (I):

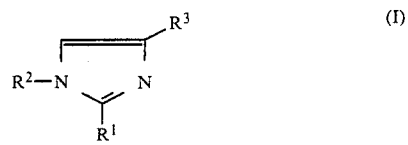

and the epoxy resin is selected from the group consisting of a bisphenol A epoxy resin, a bisphenol F epoxy resin, and a dimeric acid ester with a glycidyl epoxy resin.

5. An epoxy resin powder coating composition as claimed in claim 1, wherein said filler is selected from the group consisting of silica, calcium carbonate, dolomite, calcium silicate, alumina, clay, mica, talc, and a powdered glass fiber.

6. An epoxy resin powder coating composition as claimed in claim 1, wherein said filler is a filler having Mohs' hardness of 4 or less.

* * * * *